United States Patent [19]
Szycher et al.

[11] Patent Number: 5,863,627
[45] Date of Patent: Jan. 26, 1999

[54] HYDROLYTICALLY-AND PROTEOLYTICALLY-STABLE POLYCARBONATE POLYURETHANE SILICONE COPOLYMERS

[75] Inventors: Michael Szycher, Lynnfield; Donald Dempsey, Newbury, both of Mass.; Alan Edwards, Denbighshire, England

[73] Assignee: CardioTech International, Inc., Woburn, Mass.

[21] Appl. No.: 920,062

[22] Filed: Aug. 26, 1997

[51] Int. Cl.⁶ .............................. C08G 18/44; C08G 18/61
[52] U.S. Cl. ..................... 428/36.8; 264/189; 264/209.2; 428/36.9; 525/453; 525/459; 525/464; 528/28; 623/1; 623/12
[58] Field of Search ..................... 528/26, 28; 525/453, 525/459, 464; 264/184, 209.2; 623/1, 12; 428/36.8, 36.9

[56] References Cited

U.S. PATENT DOCUMENTS

| | | |
|---|---|---|
| 4,475,972 | 10/1984 | Wong . |
| 4,528,343 | 7/1985 | Kira . |
| 4,663,413 | 5/1987 | Ward et al. . |
| 4,675,361 | 6/1987 | Ward, Jr. . |
| 4,686,137 | 8/1987 | Ward, Jr. et al. . |
| 4,739,013 | 4/1988 | Pinchuck . |
| 4,834,746 | 5/1989 | Kira . |
| 4,861,830 | 8/1989 | Ward, Jr. . |
| 5,229,431 | 7/1993 | Pinchuck . |
| 5,376,117 | 12/1994 | Pinchuck . |
| 5,436,291 | 7/1995 | Levy . |
| 5,589,563 | 12/1996 | Ward et al. . |

FOREIGN PATENT DOCUMENTS

| | | |
|---|---|---|
| 0068385A1 | 1/1983 | European Pat. Off. . |
| 62-285917 | 12/1987 | Japan . |
| 63-006047 | 1/1988 | Japan . |
| 2140438 | 11/1984 | United Kingdom . |
| 2140444 | 11/1984 | United Kingdom . |

OTHER PUBLICATIONS

Edwards, Alan and Carson, Robert J., "Development of a Microporous Compliant Small Bore Vascular Graft," *Journal of Biomaterials Applications* 10:171–187, 1995.

*Primary Examiner*—Patricia A. Short
*Attorney, Agent, or Firm*—Clark & Elbing LLP

[57] ABSTRACT

A biocompatible, biodurable polycarbonate polyurethane with internal polysiloxane segments and devices made therefrom.

35 Claims, No Drawings

HYDROLYTICALLY-AND PROTEOLYTICALLY-STABLE POLYCARBONATE POLYURETHANE SILICONE COPOLYMERS

BACKGROUND

The invention relates to biodurable polycarbonate polyurethanes and biocompatible devices made therefrom.

Pinchuk U.S. Pat. No. 4,739,013 discloses polyurethanes which are reaction products of a polycarbonate macroglycol, a diisocyanate, and a polyfunctional poly(fluoroalkylsiloxane) having hydrolytically unstable Si—O—C moieties resulting from the reaction of a silanol-terminated monomer with a glycol [4:41–55].

Kira et al. U.S. Pat. No. 4,834,746 discloses poly(alkoxy) block copolymers with internal siloxane segments mixed with polyurethanes and polyurethaneureas for making artificial vessels [1:19–21, 3:35]. Poly(alkoxy) block copolymers contain numerous biologically unstable ether linkages. See also Ward et al. U.S. Pat. No. 4,686,137 (describing a block copolymer of polyethyleneoxide, urethane, siloxane, and polytetramethylene oxide, as a coating or film which contains numerous biologically unstable ether linkages [5:5–10, 4:31, 4:36]).

Ward et al. U.S. Pat. No. 5,589,563 discloses medical devices made of a base polymer covalently bonded to a polysiloxane-terminated polycarbonate aliphatic polyurethane, less than 5% by weight relative to the base polymer, including 1,3-cyclohexyl diamine and ethylene diamine as chain extenders [FIGS. 5 and 6, 5:64–66, 13:55–57]. Ward '563 does not teach internal siloxane segments. In fact, Ward '563 teaches that the surface-modifying moieties are preferably at the termini of the base polymer [6:55–64]. Ward '563 also teaches that silicones are resistant to oxidative degradation [9:9–10]. Example 1 uses a diethylamine terminator.

Ward et al. U.S. Pat. No. 4,675,361 discloses physical mixtures of base polymers such as polyurethanes and polycarbonates [5:35–45] with block copolymers of poly(dialkyl)-siloxanes for medical devices that contact blood [9:63–65, 2:20]. These devices have only a small percentage of the siloxane polymer additive.

Ward et al. U.S. Pat. No. 4,861,830 discloses a crosslinked, thermoset polysiloxane-polyurethane useful for surfaces which contact blood. Ward '830 teaches that silicone-containing polycarbonates have low contact angles which may be inappropriate for a blood-contacting surface [1:65–2:2].

SUMMARY OF THE INVENTION

The invention features a biodurable polycarbonate polyurethane block copolymer having one or more covalently linked polydialkylsiloxane internal segments, and devices made therefrom. A device made substantially from a biodurable block copolymer is able to maintain its physical and chemical integrity after implantation in living tissue for at least 18 months, and preferably for 2–7 years. For example, a biodurable device should be resistant to acid-catalyzed hydrolysis. Hydrolytically unstable linkages which should be avoided include Si—O—C moieties. A biodurable device should also be resistant to biological oxidation by proteolytic enzymes such as papain, urinase, or cathepsin B. Biologically unstable linkages include ether linkages (C—O—C moieties). Proteases oxidize ether oxygen atoms, leading to chain cleavage and surface fissuring or cracking of biocompatible polymers.

In one aspect, the invention features a biodurable block copolymer including (one or more of the following): (a) a polycarbonate glycol internal segment; (b) a polyurethane internal segment; (c) a polydialkylsiloxane internal segment; (d) di($C_{1-6}$ alkyl)amino or $C_{1-6}$ hydroxyalkyl terminating segments; (e) cyclo($C_{5-7}$ alkane)diamino internal segments; and (f) $C_{2-4}$ alkylene diamino internal segments. The segments are linked by urethane, urea, and C—Si—C moieties. With attention to the terminating segments and the formation of the polysiloxane, the polysiloxane, and in turn, the block copolymer, are devoid of hydrolytically unstable Si—O—C linkages. With attention to the temperature and other conditions with which the polycarbonate is manufactured, the polycarbonate, and in turn, the block copolymer, are substantially devoid of ether linkages. "Substantially devoid of ether linkages" means no ether linkages are detected by FTIR analysis.

The disclosed block copolymer can be obtained, for example, by reacting reactants including: (a) an aromatic or aliphatic diisocyanate; (b) a polycarbonate diol; (c) a difunctional polydialkylsiloxane (e.g., polydi(fluoroalkyl)siloxane) having a viscosity between 15 and 70 centistokes; (d) two chain extenders independently selected from $C_{2-8}$ diamines and $C_{2-8}$ diols; and (e) a $C_{2-6}$ alkanol or di($C_{2-6}$ alkyl) amine chain terminator, or mixture thereof. Regarding the chain extenders, the diamines and diols are cyclic, straight chain, or branched, and at least one chain extender is cyclic or branched. The copolymer is devoid of hydrolytically unstable Si—O—C linkages and substantially devoid of ether linkages.

One preferred block copolymer is obtained by reacting (a) 4,4-diphenyl methane diisocyanate or methylene bis(4-cyclohexyl isocyanate); (b) a polycarbonate diol having a molecular weight between 1000 and 3000 Daltons; (c) a polydimethylsiloxane having a viscosity between 15 and 70 centistokes (e.g., 50–60 centistokes); (d) ethylene diamine and a cyclohexane diamine (e.g., 1,3-cyclohexane diamine); and (e) a dialkylamine having between 2 and 6 carbon atoms (e.g., diethylamine).

The invention also features biocompatible and biodurable devices made substantially from the disclosed block copolymers, such as small diameter vascular grafts. This aspect of the invention includes a vascular graft including a graft wall base. The wall base includes at least 85% by weight a biodurable polycarbonate polyurethane block copolymer. The polymer includes (a) a polycarbonate glycol internal segment; (b) a polyurethane internal segment; (c) a polydialkylsiloxane internal segment; (d) di($C_{1-6}$ alkyl) amino or $C_{1-6}$ hydroxyalkyl terminating segments; (e) cyclo ($C_{5-7}$ alkane)diamino or cyclo($C_{5-7}$ alkane)dihydroxy internal segments; and (f) $C_{2-8}$ alkylene diamino or dihydroxy internal segments. The internal segments are linked by urethane, urea, and C—Si—C moieties. The block copolymer is devoid of hydrolytically unstable Si—O—C linkages and is substantially devoid of ether linkages. The graft wall is an anisotropically microporous single layer with a porosity between 60% and 80% void/volume.

Embodiments of this aspect include grafts having: (a) having no surface cracks visible by SEM to a resolution at least up to 400× after implantation as an aorta-iliac bypass graft in a dog for 12 months; (b) a radius of kinking between 7 and 15 mm, when tested without internal pressure, and a wall thickness between 0.6 mm and 0.8 mm; (c) a dynamic compression between 2% and 10%; (d) a dynamic compression between 3% and 7%; (e) an internal diameter between 2.8 mm and 6.2 mm; (f) an internal diameter between 4.8 and 6.2 mm; (g) a wall thickness between 0.2 and 1.0 mm;

or (h) a wall thickness between 0.8 and 1.0 mm, or combinations thereof.

Other embodiments of this aspect include a graft wherein the biodurable block copolymer is obtained from reactants comprising: (a) an aromatic or aliphatic diisocyanate; (b) a polycarbonate diol; (c) a difunctional siloxane, a or polydi (fluoroalkyl)siloxane having a viscosity between 15 and 70 centistokes; (d) two chain extenders independently selected from $C_{2-7}$ diamines and $C_{2-8}$ diols, wherein the diamines and diols are cyclic, straight chain, or branched, and at least one chain extender is cyclic or branched; and (e) a $C_{2-6}$ alkanol or di($C_{2-6}$ alkyl) amine chain terminator, or a mixture thereof.

Vascular grafts of the invention can be made according to the following steps. First, obtain a polymer solution comprising a polar solvent; a water soluble filler, 10% to 60% by weight; a surfactant 1% to 10% by weight; and a polycarbonate polyurethane block copolymer obtained from reactants comprising (i) an aromatic or aliphatic diisocyanate; (ii) a polycarbonate diol; (iii) a difunctional polydialkylsiloxane (e.g., Polydi(fluoroalkyl-)siloxane, polydimethylsiloxane, or poly(alkyl fluoroalkyl)siloxane) having a viscosity between 15 and 70 centistokes; (iv) two chain extenders independently selected from $C_{2-7}$ diamines and $C_{2-8}$ diols, wherein the diamines and diols are cyclic, straight chain, or branched, and at least one chain extender is cyclic or branched; and (v) a $C_{2-6}$ alkanol or di($C_{2-6}$ alkyl) amine chain terminator, or mixture thereof. The block copolymer is devoid of hydrolytically unstable Si—O—C linkages and substantially devoid of ether linkages. Second, contact the polymer solution with a mandrel surface. Third, synchronously rotate the mandrel and an extrusion head; then draw the mandrel through an extrusion head into a coagulant maintained at a temperature less than 55 degrees Centigrade (preferably 40 degrees Centigrade). Finally, allow the material to coagulate.

Other features and advantages of the invention will be apparent from the following detailed description, examples, and appending claims.

DETAILED DESCRIPTION OF THE INVENTION

The invention features a polycarbonate polyurethane block copolymer with an internal polyalkylsiloxane segment or segments, and biocompatible devices made therefrom. The copolymer is biodurable, i.e., hydrolytically stable and enzymatically (biologically) stable.

Biodurability can be established by several methods. First, according to the invention, hydrolytic durability is expected by the absence of Si—O—C linkages in the polysiloxane reactant (Example 1), the method of making the polyurethane without creating ether linkages (Examples 2 and 3), and the substantial absence of ether linkages in both the polycarbonate and the product block copolymer (Example 4). The disclosed copolymers have internal polysiloxane segments which result in an exceptionally high concentration of surface silicon (Example 5), the hydrophobicity of which further protects the copolymer from hydrolytic or enzymatic degradation according to the invention. Second, hydrolytic stability and biological stability can be established in vitro by treatment with a protease such as papain, urinase, or cathepsin B or other methods (Examples 6–8). Biodurability can be demonstrated in vivo by implanting a sample device, such as a vascular graft, in a dog for 12 to 18 months or longer, removing the device, and detecting cracks or degradation by SEM analysis (Examples 10–12).

Having described some of the advantages of the disclosed block copolymers, some methods for making them are described below. One method includes forming a prepolymer by combining a diisocyanate with a difunctional polydialkyl siloxane and a polycarbonate diol in a polar solvent such as cyclohexanone, N-methyl pyrrolidone, dimethyl acetamide, or dimethyl formamide. A mixture of at least two chain extenders and at least one chain terminator is prepared in a polar solvent. The chain extenders are independently selected from $C_{2-8}$ diamines and $C_{2-8}$ diols, wherein the diamines and diols are cyclic, straight chain, or branched. In one embodiment, at least one chain extender is cyclic or branched. The chain terminator is a $C_{2-6}$ alkanol or di($C_{2-6}$ alkyl) amine. After step (a), the prepolymer is chain extended by adding the mixture of chain extenders and chain terminator(s) with agitation, to produce the block copolymer. The difunctional polydialkylsiloxane may be replaced with a difunctional polydi(fluoroalkyl)siloxane, or a mixture of both alkyl and fluoroalkyl siloxanes.

Diisocyanates are aromatic or aliphatic diisocyanates such phenyl diisocyanate, toluene diisocyanate, isophorone diisocyanate, p-trimethylxylylene diisocyanate, m-trimethylxylene diisocyanate, and preferably 4,4-diphenyl methane diisocyanate or methylene bis (4-cyclohexyl isocyanate).

Difunctional siloxanes may be dialkylsiloxanes, wherein each alkyl group is independently selected from $C_{1-4}$ alkyl, each alkyl being optionally and independently substituted with one or more halogen atoms, such as chlorine, bromine, iodine, and preferably fluorine. Thus, dialkylsiloxanes include poly(dimethyl)siloxane, poly (methylethyl)siloxane, di($C_{1-3}$ fluoroalkyl)siloxanes, and poly ($C_{1-3}$ alkyl $C_{1-4}$ fluoroalkyl)siloxanes. Examples include polydi (perfluoromethyl)siloxane, poly(methyl 3,3,3-trifluoropropyl)siloxane, and poly (methyl perfluoroethyl) siloxane. Examples of fluoroalkyls include fluoromethyl, difluoromethyl, trifluoromethyl or perfluoromethyl, 2-perfluoroethyl, 3,3-difluoropropyl, and 3-perfluoropropyl (or 3,3,3-trifluoropropyl). In some embodiments, to increase the effect of the halogen atoms without adding too much weight, each halogen atom is on the terminal methyl group (s) of the alkyl substituents bonded to the Si atom. A difunctional siloxane reagent has terminating groups selected from $C_{1-6}$ aminoalkyl and $C_{1-6}$ hydroxyalkyl. The terminating groups preferably have between 2 and 4 carbon atoms, such as aminopropyl and hydroxypropyl. The molecular weight of a siloxane is between 800 and 30,000 Daltons, and preferably between 1000 and 3000 Daltons. Commercially available siloxanes have viscosities between 10 and 2000 centistokes, and preferably between 15 and 75 centistokes (e.g, between 20 and 60 centistokes). Commercially available siloxanes have viscosities of 10–15, 20–30, 50–60, 100–120, and 2000 centistokes (e.g., Gelest, Inc., Tullytown, Pa.). Lower viscosities generally produce stiffer copolymers which are less suitable for vascular grafts.

Polycarbonates are polyethylene polycarbonates having a molecular weight between 500 and 5000 Daltons, and preferably between 1000 and 3000 Daltons.

Chain extenders are short chain diamines or diols having between 2 and 7 carbon atoms, such as isobutane, cyclopentane, cyclohexane, and cycloheptane. Examples include ethylene glycol, 1,3-propylene glycol, 1,4-butane diol, 1,5-pentane diol, 1,6-hexane diol, 1,4-cyclohexane diol, 1,4-isophorone diol, and the corresponding diamines. Preferred chain extenders include 1,3-cyclohexane diamine, ethylene diamine, and the corresponding diols. The molar ratio of at least one branched or cyclic chain extender to isocyanate groups is generally between 3.1:100 and 5.5:100, and preferably is about 3.8:100. The molar ratio of a second chain extender to isocyanate groups is between 29:100 and 48:100, and preferably is about 35:100.

Chain terminators are monofunctional dialkylamines or alkanols having between 2 and 4 carbon atoms, such as diethylamine or hydroxypropyl. The molar ratio of the chain terminator to isocyanate groups is between 0.1:100 and 2.0:100, and is preferably about 1.5:100.

One embodiment of the invention features a polycarbonate polyurethane block copolymer obtained by reacting (a) 4,4-diphenyl methane diisocyanate or methylene bis (4-cyclohexyl isocyanate); (b) a polycarbonate diol having a molecular weight between 1000 and 3000 Daltons; (c) a polydimethylsiloxane terminated with aminopropyl groups, and having a molecular weight between 1000 and 3000 Daltons; (d) a $C_{2-4}$ alkylene diamine and a cyclohexanediamine; and (e) diethylamine. For example, the molar proportions of one preferred quadripolymer (consisting of (a) 4,4-diphenyl methane diisocyanate; (b) polycarbonate diol having a molecular weight between 1000 and 3000 Daltons; (c) ethylene diamine and 1,3-cyclohexanediamine; (d) a polydimethylsiloxane devoid of Si—O—C bonds, terminated with aminopropyl groups, and having a molecular weight between 1000 and 3000 Daltons; and (e) diethylamine) are, respectively, about (a) 100, (b) 59.51, (c) 35 and 3.9, (d) 0.8, and (e) 1.47; or within 10% or 5% thereof.

Hydroxypropyl terminated siloxanes are prepared by reacting difunctional silicon hydrides with allyl alcohol in the presence of a precious metal catalyst. It is important to recognize this hydroxyl functional polymer is devoid of unstable Si—O—C bonds, and therefore the resultant polyurethane will also be devoid of Si—O—C bonds. The molecular weight of the polyglycol can vary from 800 to 30,000 Daltons, and preferably is between 1500 and 3000. Similarly, the invention features the use of materials such as isocyanate terminated silicone oligomers synthesized using the reaction of difunctional silicon hydrides with allyl isocyanate in the presence of a precious metal catalyst, such as platinum, in catalytic amounts (e.g., 1–50 ppm, such as 5 or 10 ppm). The molecular weight of the polyisocyanate can vary from 800 to 30,000 Daltons, and preferably is between 1500 and 3000.

The following examples are illustrative, rather than limitative, of the invention.

EXAMPLES

Example 1

Preparation of hydroxyl- or isocyanate-terminated polydimethylsiloxane free of Si—O—C linkages.

The reaction of one mole of 2500 MW polydimethylsiloxane with 2 moles of allyl alcohol in the presence of chloroplatinic acid catalyst (about 5 parts per million Pt) for 70° C. for one hour yielded 2600 MW polydimethylsiloxane diol (90% yield).

Similarly, difunctional silicon hydrides (e.g., 2500 MW polydimethylsiloxane hydride) are reacted with 2 equivalents of allyl isocyanate in the presence of a chloroplatinic aicd to provide a polydimethylsiloxane diisocyanate (2600 MW).

Example 2

Preparation of biodurable polycarbonate polyurethane with internal segments of polydimethylsiloxane free of Si—O—C linkages and substantially devoid of ether linkages.

A diol mixture was prepared in a reaction kettle by blending together 579.21 g (0.283 moles) of a 2000 MW polydimethylsiloxane, hydroxyl terminated as described in Example 1. The mixture was heated with stirring to 80° C. under an inert atmosphere. To this was added 118.84 g (0.475 moles) of methylene bis(phenyl isocyanate). The reaction exotherm is controlled to 100°–110° C. and stirred constantly for 1.5 hours. Samples for % NCO for use in determining the chain extender package explained below are taken after 1.5 hours. Dimethylacetamide (2520 g) was added and the mixture was cooled to 45°–50° C. The % NCO was determined using the commonly known dibutylamine hydrochloric acid titration method. In this example, the theoretical % NCO was determined to be 2.226%. The number of equivalents of free isocyanate is calculated from the % NCO as follows: number equivalents NCO=% NCO× Wt. Reactant g/4200. For example: 2.226 ×709.54/4200= 0.377 equivalents of NCO. The weight of the triple amine chain extender package is determined using the free equivalents of isocyanate as follows: amine equivalents=equivalent weight of amine×equivalents of NCO×amine factor. In this case:

Ethylenediamine: 30×0.377×0.882=9.98 g (0.166 moles)
1,3 Cyclohexanediamine: 57.09×0.377×0.098=2.11 g (0.018 moles)
Diethylamine: 73.14×0.388×0.019=0.524 g (0.007 moles)

Into a separate clean beaker was weighed 296 g of dimethylacetamide and to this was added 9.98 g (0.166 moles) of ethylenediamine and 2.11 g (0.018 moles) of 1,3-cyclohexanediamine and 0.554 g (0.007 moles) of diethylamine. The solution was stirred and added to the reactor under rapid stirring. The polymer solution was mixed for 15 minutes and a sample was taken for FTIR analysis to determine the disappearance of the NCO band at wave number of 2260 cm$^{-1}$.

Example 3

Additional formulations

A polymer was prepared as in Example 2, replacing the hydroxyl terminated siloxane with a 2500 MW aminopropyldimethyl terminated polydimethylsiloxane. A diol mixture was prepared by blending 579.21 g (0.283 moles) of a 2000 MW polycarbonate diol and 9.69 g (0.004 moles) of the polydimethylsiloxane, aminopropyldimethyl terminated. The mixture was heated with stirring to 80° C. under an inert atmosphere. To this was added 118.84 g (0.475 moles) of methylenebis(phenylisocyanate. The reaction exotherm was controlled to 100°–110° C. and held under constant stirring for 1.5 hours.

Samples for % NCO for use in determining the chain extender package explained below were taken after 1.5 hours and 2520 g of dimethylacetamide was added. The mixture was cooled to 45°–50° C. The % NCO was determined using the dibutylamine hydrochloric acid back titration method. In this example the theoretical % NCO was

| | Formulation | | | | | | | |
|---|---|---|---|---|---|---|---|---|
| | Gms | Mol | Gms | Mol | Gms | Mol | Gms | Mol |
| MDI | 109.8 | 0.439 | 110.2 | 0.441 | 121.3 | 0.485 | 126.8 | 0.507 |
| P. Carb | 592.99 | 0.29 | 592.4 | 0.289 | 577.2 | 0.282 | 569.6 | 0.278 |
| Si | 7.769 | 0.003 | 7.8 | 0.003 | 8.58 | 0.003 | 8.97 | 0.003 |
| EDA | 7.755 | 0.129 | 7.863 | 0.131 | 10.57 | 0.176 | 11.92 | 0.199 |
| DCA | 1.639 | 0.014 | 1.662 | 0.015 | 2.235 | 0.019 | 2.52 | 0.022 |
| DEA | 0.407 | 0.005 | 0.413 | 0.006 | 0.524 | 0.007 | 0.626 | 0.008 | determined to be 2.226%. The amine equivalents were calculated as 0.166 moles of ethylene diamine, 0.018 moles of 1,3-cyclohexanediamine, and 0.007 moles of diethylamine for the calculated 0.377 equivalents of NCO. Dimethylacetamide (296 g) was weighed into a separate beaker and combined with the above-described amounts of the three amine components with stirring. The solution was added to the reactor with stirring. After mixing for 15 minutes, a sample was taken for FTIR analysis to determine the disappearnce of the NCO band.

Example 4
Substantial absence of ether linkages in the polycarbonate and the block copolymer.

The substantial absence of ether linkages can be confirmed by the absence of a typical ether band at a wave number 1130 $cm^{-1}$ using, for example, a Nicolet FTIR Model Impact 410 and Interpret I.R. software. A sample of either the polycarbonate or the block copolymer is prepared by depositing a 0.005 mil film upon a sodium chloride window and is analyzed.

Example 5
Surface Silicone and Tensile Strength as a Function of Weight Percent Silicone.

Six samples were prepared according to Table 2 on the following page. The percentage of silicone present on the surface was surprisingly high even at low bulk concentrations. For example, a block copolymer with 1.34% silicone by weight presented 14.6% silicone at its surface. According to one aspect of the invention, this silicone is presented as an internal segment (or segments) covalently linked to the bulk polymer, in contrast to those silicone-containing additives which are physically mixed with a bulk polymer, and therefore susceptible to leaching. Further, according to the invention, each internal silicone segment is presented on the surface of the coagulated polymer as a "loop" rather than a "tail" as with prior silicone-terminated polymers. This enhanced surface hydrophobicity reinforces the biodurability of the block copolymer by inhibiting both hydrolytic and enzymatic degradation. Poly di(fluoroalkyl)siloxanes may further enhance surface hydrophobicity.

TABLE 2

| FORMULATIONS | WEIGHT % | | | | | |
|---|---|---|---|---|---|---|
| | 0% | 1.40% | 4% | 6% | 8% | 16% |
| Metheylene bis(p-phenyliscynate) | 16.54 | 16.5 | 16.42 | 16.33 | 16.3 | 15.45 |
| Polycarbonatediol | 81.71 | 80.41 | 77.82 | 75.8 | 74 | 66.91 |
| Polysilicone carbinaol and or amine | 0 | 1.34 | 4.02 | 6.12 | 7.97 | 15.92 |
| Ethylenediamine | 1.39 | 1.9 | 1.38 | 1.39 | 1.37 | 1.37 |
| 1,3,Diaminocyclohexane | 0.29 | 0.29 | 0.29 | 0.29 | 0.29 | 0.29 |
| Diethanolamine | 0.07 | 0.07 | 0.07 | 0.07 | 0.07 | 0.07 |
| Total | 100 | 100 | 100 | 100 | 100 | 100 |
| Theoretical Silicone % (bulk) | 0 | 1.34 | 4 | 6 | 8 | 16 |
| ESCA analysis for Silicone % (surface) | 0.6 | 14.6 | 14.8 | NA | 16.8 | 20.9 |
| Film ppt. in water | | | 12.1 | | | |
| Ultimate Tensile psi | 5600 | 5106 | 3314 | 4493 | 3900 | NA |
| Standard Deviation | | 439 | 787 | 400 | 859 | NA |
| Elongation % | 500 | 443 | 569 | 277 | 410 | NA |
| Stantard Deviation | | | | | | |

Example 6
In vitro proteolytic stability

This is a modification of an in vitro test method developed by Zhao et al. (J. Biomed. Mat. Res. 27:379–389, 1993) using glass wool and a hydrogen peroxide/cobalt (II) chloride ($H_2O_2/CoCl_2$) mixture to replicate the oxidizing effects of macrophages in vivo. The longitudinally pre-stressed tubing test specimens and control specimens (30 mm long×5 mm diameter) are embedded into a 5–7 mm thick layer of fiberglass wool (from Fisons Scientific Equipment) in a 132 mm diameter×5 mm high glass (Simax) dish (See FIG. 3). Preliminary investigations using the Estane material showed that the concentrations used by Zhao et al. were ideal for use in this test. A volume of 100 ml solution of 1.63M $H_2O_2$ and 0.05M cobalt (II) chloride hexahydrate ($CoCl_2$ $6H_2O$) 98% A.C.S. (from Aldrich Chemical Co. Ltd.) is poured onto the fiberglass wool. The 1.63M $H_2O_2$ is prepared from a 40 vol $H_2O$ solution containing 850 mg/liter of the stablizer $Na_2H_2P_2O_7$ disodium pyrophosphate (from Fisons Scientific Equipment) which is incorported by the chemical supplier to inhibit the spontaneous breakdown of the hydrogen peroxide.

The glass dishes are covered with plastic film to prevent excessive evaporation and the samples are incubated in an oven at 37° C.±3° C. for a period of up to 250 days. The glass wool is replaced once a month and the $H_2O_2/CoCl_2$ solution is replaced every three to four days with fresh solution. During each solution change, the specimens are examined under optical microscope (up to 40×magnification) for any sign of surface change or crack development. The test is ended when the sample showed signs of severe cracking, protrusion of the mandrel, or cracks traversing the tubing wall. At intervals through out the treatment, representative samples of each polymer are rinsed in distilled water and dried in air before being analyzed in detail using a 25 KV scanning electron microscope (SEM, Stereoscan 360, Cambridge Instruments).

Example 7

In vitro hydrolytic stability

Accelerated aging can be performed at elevated temperatures employing the Arrhenius equation to determine the useful life of any given polymer. The Arrhenius equation states that for every 10 degree increase in temperature, a given reaction rate will double. Therefore polymer samples stored at some elevated temperature such as 80° C. will hydrolyze at a rate 16 times faster than those implanted in a living animal (e.g., mammal) at approximately 38° C. Specimens are stored in distilled water at 80° C. and periodically sampled and tested for a change in physical properties (tensile and % elongation). At an interval when the values have been reduced to 50% of their original value it can be considered the half life of the material under these given conditions. The results are extrapolated to predict the time needed at 38° C. to reach an equivalent loss in physical values.

Example 8

In vivo stability

This test, designed to accelerate ESC in vivo using excessive strain as the accelerant, has been described by Stokes et al., Polyurethanes in Biomedical Engineering II, H. Planck, et al., eds. Amsterdam: Elsevier, pp. 109–128, 1987. Extruded tubing (0.6 mm) is stretched over 0.5 inch long, dumbbell-shaped mandrels to 400% elongation. The strain is fixed at the ends with polyester suture. Other samples are mounted without stretching over similar mandrels while some unstretched tubing samples are filled with Medical Adhesive to keep pressure applied by tissue from collapsing it and imposing uncontrolled strain. Other specimens may be prepared using different compositions or manufacturing processes, such as annealing, solvent extraction, extrusion conditions, different strains, etc. The experimental specimens are implanted with control in the dorsal subcutis of rabbits. Specimens are typically explanted at twelve weeks for screening studies, but some implants have continued up to for 6, 12, 18, or 24 months. According to Stokes, the industry standard is generally six months.

Example 9

Formation of microporous, biodurable vascular grafts

Vascular grafts can be prepared according to a low temperature cast coagulation method, as described in U.S. Pat. No. 5,132,066 (Charlesworth et al., 1992), the entirety of which is incorporated herein. This method forms a graft with an outer skin, an inner skin, and a spongy middle layer. Briefly, a casting solution includes (a) between 10% and 60%, and preferably about 40%, by weight of a water soluble filler or porosifier such as disodium carbonate, (b) between 0.5% and 10%, and preferably between 0.5% and 5%, by weight of a pharmacuetical grade surfactant such as polysorbate or sodium laurylsulfate, and (c) between 30% and 89%, and preferably about 58%, of a polymer solution containing between 18% and 25% (e.g., 21%) of a disclosed biocompatible polymer.

The casting solution is extruded onto the surface of a mandrel. The mandrel and extrusion head rotate in synchronization to minimize shear and residual stress. A 2.5 m mandrel is drawn through an extrusion head into a coagulant maintained between 35° C. and 55° C., and preferably between 38° C. and 42° C. Coagulants include aqueous solutions of dimethyl acetamide, methanol, and, preferably, water alone. In some cases, the surfactant in the casting solution may be omitted or supplemented by the presence of a surfactant in the coagulant. During phased coagulation, the filler prevents collapse of the structure as the solvent disperses and the filler dissolves into the coagulant, resulting in a single layer, microporous structure.

Example 10

In vivo graft stability

Segmented polyurethanes were synthesized from MDI, polycarbonate diol, and ethylene diamine in DMAc in a 2:1:0.97 molar ratio. Microporous 5 mm vascular grafts were fabricated from this polymer in accordance with the method described in U.S. Pat. No. 5,132,066 and implanted in canines in an aorto-femoral position for periods of up to 20 months, when the animals were electively sacrificed.

After sacrifice, the samples were explanted en block, stored in cold saline, and enzymatically cleaned in an incubator at 38° C. The examples were analyzed by SEM, and by Gel Permeation Chromatography to ascertain molecular weight distributions before (control) and after implantation. The molecular weights were analyzed by dissolving the samples in DMAC containing 0.1% LiBr. Aniline was used as a flow rate marker. The columns were thermostatted at 70° C. and calibrated with poly(ethylene oxide) poly(ethylene glycol) standards.

Example 11

Vascular Access and Biodurability In Vivo.

Two 5 mm ID grafts are implanted as carotid artery interposition grafts in each of four dogs. The implants are explanted after six, fifteen, and twenty-two weeks and examined for cracks or other undesirable events. Light microscopy (e.g., between 40× and 1100×, such as 200×, 400×, 600×, 800×, and 1000×) is used to show the extent of neointima lining the anastomotic region of the graft, the extent of lumenal reduction, and the composition of the surrounding capsule.

Example 12

Short-Term Vascular Access and Biodurability In Vivo

Two 5 mm ID grafts are implanted as bilateral aorta-femoral bypasses with the iliac arteries tied off. Over a period of at least 20 weeks, patency is monitored by color-codedDuplex examination, Doppler analysis, or angiography.

Example 13

Dynamic Compliance

Dynatek Laboratories provides a calibrated positive displacement instrument that measures dynamic compliance over a pressure excursion of 80 mm Hg to 120 mm Hg at a cycle rate of seventy-two beats per minute. Small bore grafts having a compliance between 2% to 10%, and preferably 3% to 7%, radial compliance have been prepared.

Example 14

Pulsatile Flow In Situ

Pulsatile flow is measured using digital subtraction angiography as described by Sefalian, A. M. *Vascular Imaging for Surgeons*, R. M. Greenhalgh, e., W. B. Saunders ISBN 0-7020-2015-X 1995.

Example 15

Seal-Sealing

An artificial circuit working at a 120 nm Hg, circulating water at 37° C. is used. The graft are punctured with a 16 gauge dialysis needle and the needle is withdrawn. The punctured site is photographed immediately after needle withdrawal. If practicable, water loss is measured.

Example 16

Strength after Repeated Puncture

According to ANSI/AAMI VP20-1994, 8.3.4, repeated punctures per square centimeter (0, 8, 16, and 24) simulate months of dialysis use (respectively, 0, 6, 12, and 18). Multiple samples are treated for each test condition. The respective mean radial tensile strengths (N/nm) are calculated and compared with the strength of similarly-treated, commercially available materials such as GORETEX. Maintaining a radial tensile strength greater than 1 N/mm is desirable.

Example 17

Kinking Radius

The minimum loop radius (kinking radius) is determined by forming a loop from a length of graft and pulling the free ends in opposite directions until the graft starts to kink. The inside diameter of the loop just before the graft starts to kink is divided in half to yield the loop radius. This measurement is taken without internal pressure; a second measurement is taken with internal pressure, approximately 120 mm Hg of circulating water, preferably at physiological temperature. A length of graft at least 200 mm long is placed in the water bath, and the minimum loop radius is determined again. Generally, for a graft having a wall thickness between 0.6 and 0.8 mm, the kinking radius is between 5 and 12 mm for a reinforced graft (without pressure); and between 7 and 15 mm (without pressure) and between 6 and 12 mm (with pressure) for a graft without reinforcement.

OTHER EMBODIMENTS

Based on the description and examples herein, a person of skill would be able to understand the essential features of the invention and without departing from the spirit and scope thereof, adapt the invention to various conditions and usages.

What is claimed is:

1. A biodurable polycarbonate polyurethane block copolymer comprising
   (a) a polycarbonate glycol internal segment;
   (b) a polyurethane internal segment;
   (c) a polydialkylsiloxane internal segment;
   (d) di($C_{1-6}$ alkyl)amino or $C_{1-6}$ hydroxyalkyl terminating segments;
   (e) cyclo($C_{5-7}$ alkane)diamino internal segments; and
   (f) $C_{2-4}$ alkylene diamino internal segments;
wherein said segments are linked by urethane, urea, and C—Si—C moieties, said block copolymer being devoid of hydrolytically unstable Si—O—C linkages and being substantially devoid of ether linkages.

2. A biodurable polycarbonate polyurethane block copolymer, obtained from reactants comprising
   (a) an aromatic or aliphatic diisocyanate;
   (b) a polycarbonate diol;
   (c) a difunctional polydialkylsiloxane having a viscosity between 15 and 70 centistokes;
   (d) two chain extenders independently selected from $C_{2-8}$ diamines and $C_{2-8}$ diols, wherein said diamines and diols are cyclic, straight chain, or branched, and at least one chain extender is cyclic or branched; and
   (e) a $C_{2-6}$ alkanol or di($C_{2-6}$ alkyl) amine chain terminator, or mixture thereof;
wherein said block copolymer is devoid of hydrolytically unstable Si—O—C linkages and substantially devoid of ether linkages.

3. A copolymer of claim 2 wherein said diisocyanate is selected from 4,4-diphenyl methane diisocyanate, phenyl diisocyanate, toluene diisocyanate, isophorone diisocyanate, m-trimethylxylylene diisocyanate, p-trimethylxylylene diisocyanate, and methylene bis (4-cyclohexyl isocyanate).

4. A copolymer of claim 3 wherein said diisocyanate is selected from 4,4-diphenyl methane diisocyanate and methylene bis (4-cyclohexyl isocyanate).

5. A copolymer of claim 2 wherein said polycarbonate is polyethylene carbonate having a molecular weight between 500 and 5000 Daltons.

6. A copolymer of claim 5 wherein said polycarbonate has a molecular weight between 1000 and 3000 Daltons.

7. A copolymer of claim 2 wherein the molar ratio of polycarbonate to isocyanate groups is between 55:100 and 65:100.

8. A copolymer of claim 2 wherein said chain extenders are selected from ethylene glycol, 1,3-propylene glycol, 1,4-butane diol, 1,5-pentane diol, 1,6-hexane diol, 1,4-cyclohexane diol, and 1,4-isophorone diol.

9. A copolymer of claim 2 wherein said chain extenders are selected from ethylene diamine, 1,3-propylene diamine, 1,4-butane diamine, 1,5-pentane diamine, 1,6-hexane diamine, 1,4-cyclohexane diamine, and 1,4-isophorone diamine.

10. A copolymer of claim 8 wherein said chain extenders are selected from 1,3-cyclohexane diol and ethylene glycol.

11. A copolymer of claim 9 wherein said chain extenders are selected from 1,3-cyclohexane diamine and ethylene diamine.

12. A copolymer of claim 2 wherein the molar ratio of said at least one branched or cyclic chain extender to isocyanate groups is between 3.1:100 and 5.5:100.

13. A copolymer of claim 12 wherein the molar ratio of said at least one branched or cyclic chain extender to isocyanate groups is about 4.9:100.

14. A copolymer of claim 2 wherein the molar ratio of a chain extender to isocyanate groups is between 38:100 and 48:100.

15. A copolymer of claim 14 wherein the molar ratio of a chain extender to isocyanate groups is about 44:100.

16. A copolymer of claim 2 wherein said chain terminator has between 2 and 4 carbon atoms.

17. A copolymer of claim 2 wherein said chain terminator is diethyl amine.

18. A copolymer of claim 2 wherein the molar ratio of said chain terminator to isocyanate groups is between 0.1:100 and 2:100.

19. A copolymer of claim 2 wherein the molar ratio of said chain terminator to isocyanate groups is about 1.5:100.

20. A copolymer of claim 2 wherein said siloxane is polydimethylsiloxane.

21. A copolymer of claim 2 wherein said siloxane is a polydi(fluoro-$C_{1-3}$ alkyl)siloxane or a poly($C_{1-3}$ alkyl $C_{1-4}$ fluoroalkyl)siloxane.

22. A copolymer of claim 21 wherein said siloxane comprises a fluoroalkyl group selected from fluoromethyl, difluoromethyl, trifluoromethyl, 2-perfluoroethyl, and 3-perfluoropropyl.

23. A copolymer of claim 2 wherein said siloxane has a terminating group selected from a $C_{1-6}$ aminoalkyl and $C_{1-6}$ hydroxyalkyl.

24. A copolymer of claim 23 wherein said terminating group has between 2 and 4 carbon atoms.

25. A copolymer of claim 24 wherein said terminating group is aminopropyl or hydroxypropyl.

26. A polycarbonate polyurethane block copolymer of claim 2, obtained by reacting
   (a) 4,4-diphenyl methane diisocyanate or methylene bis (4-cyclohexyl isocyanate);
   (b) a polycarbonate diol having a molecular weight between 1000 and 3000 Daltons;
   (c) a polydimethylsiloxane having a viscosity between 15 and 70 centistokes;
   (d) ethylene diamine and a cyclohexane diamine; and
   (e) a dialkylamine having between 2 and 6 carbon atoms.

27. A copolymer of claim 26 wherein said polydimethylsiloxane is terminated with aminopropyl groups.

28. A copolymer of claim 26 wherein said dialkylamine is diethylamine, ethylmethylamine, or ethylpropylamine.

29. A copolymer of claim 26 wherein said diisocyanate is 4,4-diphenyl methane diisocyanate.

30. A copolymer of claim 26 wherein said polycarbonate diol has a molecular weight between 2000 and 3000 Daltons.

31. A copolymer of claim 26 wherein said cyclohexanediamine is 1,3-cyclohexane diamine.

32. A block copolymer of claim 26 wherein the molar proportions are, respectively, within 5% of (a) 100, (b) 59.51, (c) 0.8, (d) 35.0 and 3.9, and (e) 1.5.

33. A block copolymer of claim 26 wherein a test sample of copolymer has no surface cracks visible by SEM to a resolution between 40× at 400% elongation after being subjected to the Stokes' test for 6 months.

34. A vascular graft comprising a graft wall base including at least 85% by weight a biodurable polycarbonate polyurethane block copolymer comprising
   (a) a polycarbonate glycol internal segment;
   (b) a polyurethane internal segment;
   (c) a polydialkylsiloxane internal segment;
   (d) di($C_{1-6}$ alkyl)amino or $C_{1-6}$ hydroxyalkyl terminating segments;
   (e) cyclo($C_{5-7}$ alkane)diamino or cyclo($C_{5-7}$ alkane) dihydroxy internal segments; and
   (f) $C_{2-8}$ alkylene diamino or dihydroxy internal segments; wherein said segments are linked by urethane, urea, and C—Si—C moieties, said block copolymer being devoid of hydrolytically unstable Si—O—C linkages and being substantially devoid of ether linkages;
   said graft wall being an anisotropically microporous single layer with a porosity between 60% and 80% void/volume.

35. A method of making a vascular graft, said method comprising
   (a) obtaining a polymer solution comprising
      a polar solvent;
      a water soluble filler, 10% to 60% by weight;
      a surfactant 1% to 10% by weight; and
      a polycarbonate polyurethane block copolymer obtained from reactants comprising
         (i) an aromatic or aliphatic diisocyanate;
         (ii) a polycarbonate diol;
         (iii) a difunctional polydialkylsiloxane or polydi(fluoroalkyl)siloxane having a viscosity between 15 and 70 centistokes;
         (iv) two chain extenders independently selected from $C_{2-7}$ diamines and $C_{2-8}$ diols, wherein said diamines and diols are cyclic, straight chain, or branched, and at least one chain extender is cyclic or branched; and
         (v) a $C_{2-6}$ alkanol or di($C_{2-6}$ alkyl) amine chain terminator, or mixture thereof;
      wherein said block copolymer is devoid of hydrolytically unstable Si—O—C linkages and substantially devoid of ether linkages;
   (b) contacting said polymer solution with a mandrel surface;
   (c) synchronously rotating said mandrel and an extrusion head;
   (d) drawing said mandrel through an extrusion head into a coagulant maintained at a temperature less than 55 degrees Centigrade (preferably 40 degrees Centigrade); and
   (e) allowing coagulation.

* * * * *